United States Patent
Ramey, II et al.

(10) Patent No.: US 8,373,717 B2
(45) Date of Patent: Feb. 12, 2013

(54) UTILIZATION OF SYMMETRICAL PROPERTIES IN RENDERING

(75) Inventors: William Orville Ramey, II, Santa Clara, CA (US); Henry Packard Moreton, Woodside, CA (US); Douglas H. Rogers, Gilroy, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1202 days.

(21) Appl. No.: 11/740,000

(22) Filed: Apr. 25, 2007

(65) Prior Publication Data

US 2008/0266296 A1    Oct. 30, 2008

(51) Int. Cl.
G09G 5/00    (2006.01)

(52) U.S. Cl. .................................................... 345/582

(58) Field of Classification Search .............. 345/421, 345/582
See application file for complete search history.

(56) References Cited

U.S. PATENT DOCUMENTS

| | | | | |
|---|---|---|---|---|
| 6,018,352 | A * | 1/2000 | Saito | 345/678 |
| 6,525,722 | B1 * | 2/2003 | Deering | 345/419 |
| 6,879,324 | B1 | 4/2005 | Hoppe | |
| 7,015,909 | B1 | 3/2006 | Morgan III et al. | |
| 2006/0017721 | A1 * | 1/2006 | Couture-Gagnon | 345/419 |
| 2006/0146049 | A1 * | 7/2006 | Pulli et al. | 345/421 |

FOREIGN PATENT DOCUMENTS

WO    WO 2004036504 A1 *    4/2004

OTHER PUBLICATIONS

"Nvidia Brings Cutting-Edge Directx 10 Graphics and HD Video to All PC Users";http://www.nvidia.com/object/IO_41448.html; retrived Nov. 22, 2010, dated Apr. 17, 2007, 2 pages.
Tariq, S.; "Directx 10 Effects" Siggraph 2006, Jul.-Aug. 2006, 67 pages.
Office action dated Nov. 29, 2010 from U.S. Appl. No. 11/740,016, 13 pages.
Office action dated Nov. 30, 2010 from U.S. Appl. No. 11/740,009, 12 pages.
ATI, 3Dc White Paper, http://web.archive.org/web/20040507031026/http:www.ati.com/products/radeonx800/3DcWhitePaper.pdf, archived May 2004.
Blythe, D., "The Direct3D 10 System," ACM Proceedings of SIG-GRAPH'06, pp. 724-734, (Jul. 2006).
Kolb, A., et al., "Hardware-based Simulation and Collision Detection for Large Particle Systems," Proceedings of the ACM SIGGRAPH/EUROGRAPHICS conference on Graphics hardware 2004, Grenoble, France, pp. 123-150, (Aug. 29-30, 2004).
Office Action of Aug. 11, 2010 in related U.S. Appl. No. 11/740,009, 13 pages.
Office Action of Aug. 16, 2010 in related U.S. Appl. No. 11/740,016, 12 pages.

* cited by examiner

*Primary Examiner* — Edward Martello
(74) *Attorney, Agent, or Firm* — Kilpatrick Townsend & Stockton LLP

(57) ABSTRACT

The symmetrical properties of a group of vertices are leveraged to reconstruct the group using vertex data for a subset of the vertices and a set of control data. The subset of vertices is symmetrical to one or more other subsets of vertices in the group, and the control data includes information to reconstruct the one or more other subsets using the vertex data for the first set of vertices and symmetrical characteristics of the group. In some embodiments, reconstruction is performed using a geometry shader in a graphics processor to compute the additional vertices.

24 Claims, 10 Drawing Sheets

UTILIZATION OF SYMMETRICAL PROPERTIES IN RENDERING

BACKGROUND OF THE INVENTION

The present invention relates in general to computer graphics, and in particular to the use of the symmetrical characteristics of a set of vertices in rendering.

Many computer generated images are created by mathematically modeling the interaction of light with a three-dimensional (3D) scene from a given viewpoint and projecting the result onto a two-dimensional (2D) "screen." This process, called rendering, generates a 2D image of the scene from the given viewpoint and is analogous to taking a digital photograph of a real-world scene.

As the demand for computer graphics, and in particular for real-time computer graphics, has increased, computer systems with graphics processing subsystems adapted to accelerate the rendering process have become widespread. In these systems, the rendering process is often divided between a computer's general-purpose central processing unit (CPU) and a graphics processing subsystem. Typically, the CPU performs high-level operations, such as determining the position, motion, and collision of objects in a given scene. From these high-level operations, the CPU generates a set of rendering commands and data defining the desired rendered image (or images). Rendering commands and data can define scene geometry by reference to groups of vertices. Groups of points, lines, triangles and/or other simple polygons defined by the vertices may be referred to as "primitives." Each vertex may have attributes such as color, world space coordinates, texture-map coordinates, and the like. Rendering commands and data can also define other parameters for a scene, such as lighting, shading, textures, motion, and/or camera position. From the set of rendering commands and data, the graphics processing subsystem creates one or more rendered images. In a given image to be rendered, groups of vertices may be symmetrical to one another. Similarly, primitives (or subparts thereof) may be symmetrical to one another, as well.

Graphics processing subsystems typically use a stream, or pipeline, processing model, in which input elements are read and operated on successively by a chain of processing units. The output of one processing unit is the input to the next processing unit in the chain. A typical pipeline includes a number of processing units, which generate attribute values for the 2D or 3D vertices; create parameterized attribute equations for points in each primitive, and determine which particular pixels or sub-pixels are covered by a given primitive. Typically, data flows one way, "downstream," through the chain of units, although some processing units may be operable in a "multi-pass" mode, in which data that has already been processed by a given processing unit can be returned to that unit for additional processing.

The data sent to the graphics processing subsystem typically defines a set of vertices to be used in rendering the final image. However, the speed at which the entire set of vertices can be rendered through the pipeline may be limited by the available bandwidth to the GPU. Many computer graphics applications require complex, detailed models. As rendered scenes become more complex, they typically include a larger number of vertices. Due to the complexity of managing all vertices in a scene, more vertex data than is strictly necessary is typically sent through the pipeline. Processing bottlenecks can occur, for instance, if the system design does not provide sufficient bandwidth to communicate all of the vertices through various stages of the pipeline.

It is therefore desirable to send less vertex data through select parts of graphics pipeline, in order to decrease wasteful rendering operations, reduce the bandwidth requirements for communicating vertices and associated attributes, and improve rendering performance.

BRIEF SUMMARY OF THE INVENTION

Embodiments of the present invention provide for leveraging symmetrical characteristics of a group of vertices to reconstruct the group using only a subset of the vertices and control data with parameters for reconstruction. In some embodiments, reconstruction is performed using a geometry shader in a graphics processor to compute the additional vertices to reconstruct the group. To the extent that vertex data for the group of vertices is compressed into vertex data for a subset of the vertices and control data with parameters for reconstruction, less data is delivered to, and through, portions of the graphics pipeline. This may reduce bottlenecks and improve throughput in the pipeline.

In one set of embodiments, a method of processing vertex data to reconstruct a group of vertices is described. Vertex data is received for a first subset of the group of vertices symmetrical to one or more other subsets of the group. This first subset of vertices may be referred to hereinafter as "the reference subset." A set of control data is received including parameters for reconstructing the other subsets of vertices using the vertex data for the reference subset. Additional vertices are computed using the control data and the vertex data to thereby reconstruct the other sets of vertices. In this manner, the vertex data for the group of vertices to be reconstructed may be compressed into a set of data which includes control data and the vertex data for only a subset of the group, i.e. the reference subset.

In another set of embodiments, an alternative method of processing vertex data is described. In these embodiments, vertex data is received for a group of vertices, and a reference subset of the group is identified which is symmetrical to one or more other subsets of the group. A set of control data is created including parameters for reconstructing the other subsets using vertex data for the reference subset. Additional vertices are computed using the control data and the vertex data for the reference subset to thereby reconstruct at least a part of the one or more other subsets.

In one embodiment, a symmetry group including the group of vertices is identified. The symmetry group may, for example, be based on one or more of the following symmetries: reflection symmetry, rotational symmetry, translational symmetry, glide reflection symmetry, rotoreflection symmetry, and screw axis symmetry. The symmetry relationship may exist within a threshold level of error (i.e., the symmetry relationship need not be exact). The vertex data for the group of vertices may be changed into a compressed set of data including the vertex data for the reference subset and the control data. The compressed set of data may be passed (e.g., through a graphics pipeline) in lieu of the vertex data for the group of vertices. The compressed set of data may be decompressed by using the vertex data for the reference subset and the control data to reconstruct the group of vertices. It is worth noting that a particular vertex may be included in both the first subset and in the subset symmetrical thereto.

In an alternative set of embodiments, a graphics processor includes a geometry shader and one or more upstream processing units. The upstream processor may, for example, be a vertex shader. The one or more upstream processors are configured to pass vertex data, the vertex data including a first subset of vertices (i.e., the reference subset). The reference subset is symmetrical to one or more other subsets of vertices in an image to be rendered. The geometry shader is configured to receive the vertex data from the upstream processing units, and receive control data as well. The geometry shader is configured to compute additional vertices using the vertex data for the reference subset and the control data to thereby reconstruct the other sets of vertices.

In one embodiment, an upstream processing unit is further configured to pass a set of control data including parameters for reconstructing at least a part of the one or more other subsets using vertex data for the reference subset. In an alternative embodiment an upstream processing unit is configured to receive the set of control data from another source.

In one embodiment, an upstream processing unit is configured to compress the vertex data for the group of vertices into a compressed set of data including the vertex data and the control data. In other embodiments, the compressed data may be received from other sources, as well. The upstream processing unit may pass the compressed set of data to the geometry shader in lieu of the vertex data for the group of vertices, and the geometry shader may be configured to compute the additional vertices for the group using the compressed data. It is worth noting that the symmetry within the group may, for example, be based on one or more of the following: reflection symmetry, rotational symmetry, translational symmetry, glide reflection symmetry, rotoreflection symmetry, and screw axis symmetry.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted or combined. Also, features and other aspects described with respect to certain embodiments may be combined in various other embodiments.

It should also be appreciated that the following systems, methods, and software may be a component of a larger system, wherein other procedures may take precedence over or otherwise modify their application. Also, a number of steps may be required before, after, or concurrently with the following embodiments.

In various embodiments of the invention, symmetrical properties of a group of vertices are leveraged to reconstruct the group using vertex data for a only a reference subset of its vertices and a set of control data. The reference subset is symmetrical to one or more other subsets of vertices in the group, and the control data includes information to reconstruct the one or more other subsets using the vertex data for the reference subset and symmetrical characteristics of the group. In some embodiments, reconstruction is performed using a processing engine in a graphics processor to compute the additional vertices.

Figure 1:
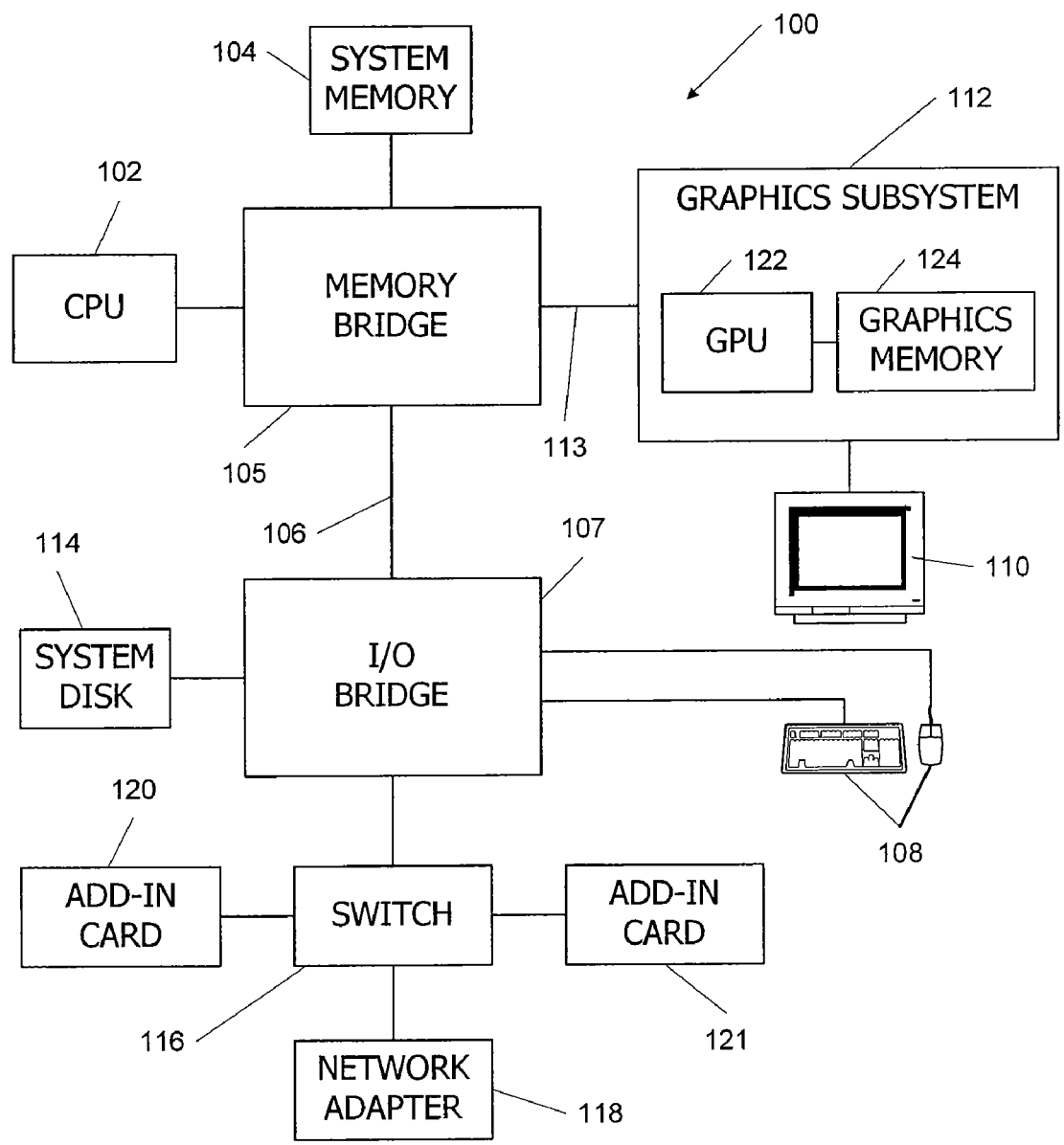
FIG. 1 is a block diagram of a computer system configured according to various embodiments of the present invention.

FIG. 1 is a block diagram of a computer system 100 according to one embodiment of the present invention. Computer system 100 includes a central processing unit (CPU) 102 and a system memory 104 communicating via a bus path that includes a memory bridge 105. Memory bridge 105, which may be, e.g., a conventional Northbridge chip, is connected via a bus or other communication path 106 (e.g., a HyperTransport link) to an I/O (input/output) bridge 107. I/O bridge 107, which may be, e.g., a conventional Southbridge chip, receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus or other communication path 113, e.g., a PCI Express (PCI-E) or Accelerated Graphics Port (AGP) link. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI-E, AGP, HyperTransport, or any other bus or point-to-point communication protocol(s), and connections between different devices may use different protocols as known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

Various components of computer system 100 may receive or otherwise produce geometry data which includes, for example, objects defined by a number of vertices. In one embodiment, CPU 102 executes one or more programs to identify a subset of vertices (a "reference subset") which are symmetrical to one or more other subsets of vertices for an image to be rendered. CPU 102 may identify a symmetry group among a number of vertices for a scene to be rendered, and then identify a particular reference subset that is symmetrical to one or more other subsets of the group. Alternatively, CPU 102 may receive data identifying a reference subset symmetrical to one or more other sets of vertices. For example, a graphics application may include geometry data with predefined symmetry groups. As used herein, a 'symmetry group' refers to a set of vertices which include a first subset of the vertices that are symmetrical to one or more other subsets of vertices of the set.

As noted above, many computer graphics applications have highly detailed models, which may have significant computational costs. CPU 102 creates or otherwise identifies vertex data for only a subset of a group of vertices (i.e., a reference subset), which are symmetrical to one or more other subsets of vertices of the group. CPU 102 may forward vertex data for the reference subset to the rendering pipeline of GPU 122.

In conjunction with identifying vertex data for the reference subset, CPU 102 may execute a program to create a set of control data. This control data may include parameters (i.e., information, instructions, or other guidelines) for computing at least some of the vertices for the remainder of the symmetry group using vertex data for the reference subset. The control data may include information describing the particular symmetry operator, and the location of the vertices to be reconstructed in reference to the identified set of vertices. This control data may be included with or otherwise integrated into per-vertex attributes. Control data may be applicable to each of a subset of the set of vertices for a symmetry group, or may be applied on a per-vertex basis. Therefore, control data may be used in a variety of ways to process the vertex data to reconstruct the symmetry group. CPU 102 may forward this control data to the rendering pipeline of GPU 122.

In one embodiment, CPU 102 compresses the vertex data for the vertices of a symmetry group into a compressed set of data, the compressed set including the vertex data for a reference subset of vertices and associated control data. CPU 102 may forward the compressed data to the rendering pipeline of GPU 122.

Also, it is worth noting that any combination of the vertex data and control data may be received via the network adapter 118, or otherwise, from an external computing device local or remote to the system 100. Also, any combination of the vertex data and control data may be retrieved from memory local or remote to the system 100. This received vertex data and control data together may be forwarded (e.g., in the form of a compressed set of data) to a rendering pipeline of GPU 122. In one embodiment, the identification of the set of vertices and creation of the control data may be executed, in whole or in part, by GPU 122.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107. In still other embodiments, some or all elements of GPU 122 may be integrated into CPU 102.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices and systems, including general purpose computer systems, video game consoles and other special purpose computer systems, DVD players, handheld devices such as mobile phones or personal digital assistants, and so on.

Figure 2:
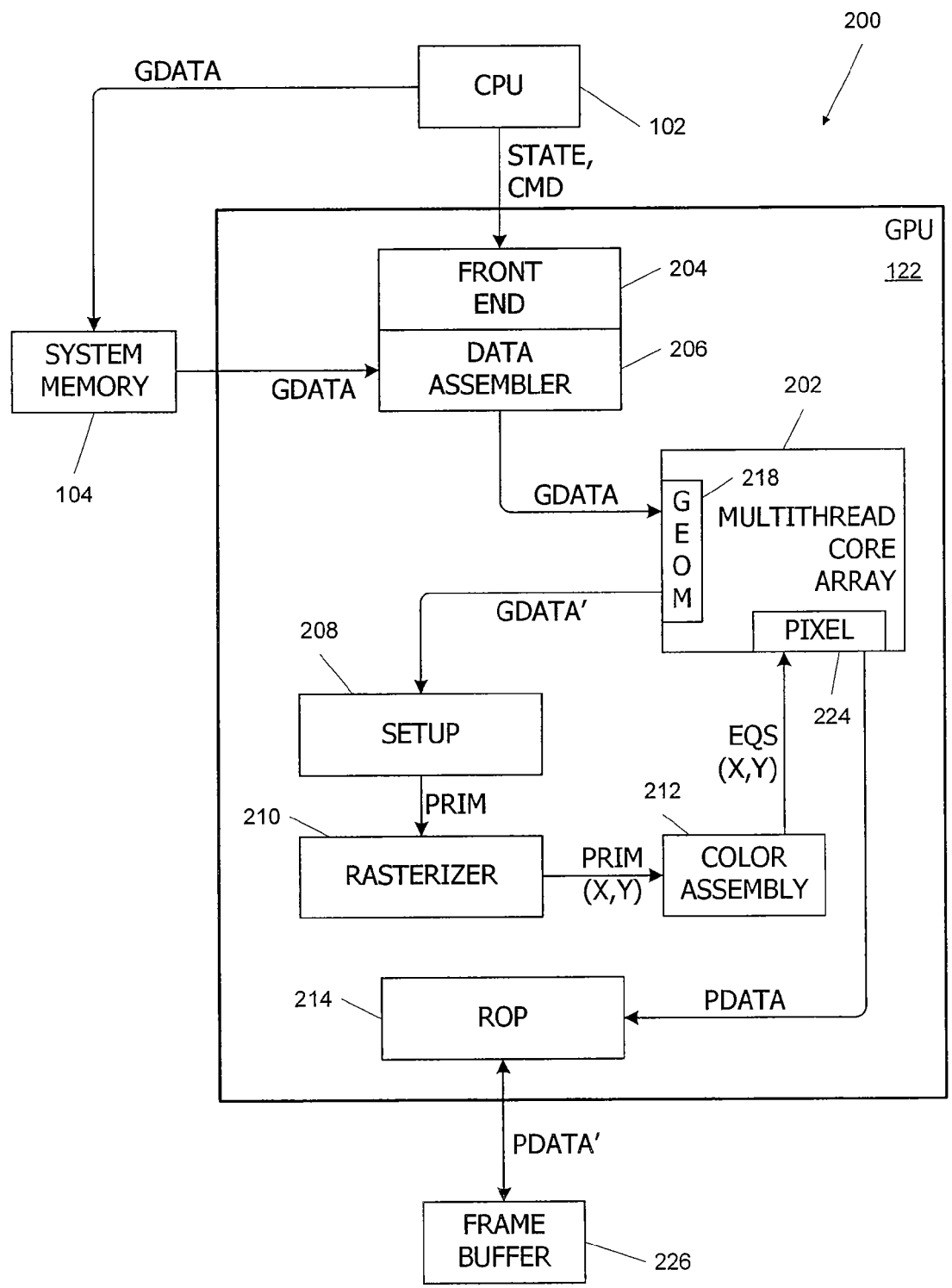
FIG. 2 is a block diagram of a rendering pipeline of a graphics processing subsystem configured according to various embodiments of the present invention.

FIG. 2 is a block diagram of a rendering pipeline 200 that may be implemented in GPU 122 of FIG. 1 according to an embodiment of the present invention. In this embodiment, the rendering pipeline 200 is configured to receive vertex data for a reference subset of a group of vertices. It may also receive control data with parameters for reconstructing at least some of the other subsets of the group using the vertex data for the reference subset. The rendering pipeline 200 in this embodiment is implemented using an architecture in which any applicable vertex shader programs, geometry shader programs, and pixel shader programs may be executed concurrently using the same parallel-processing hardware, referred to herein as a "multithreaded core array" 202. Multithreaded core array 202 is described further below.

In addition to multithreaded core array 202, rendering pipeline 200 includes a front end 204 and data assembler 206, a setup module 208, a rasterizer 210, a color assembly module 212, and a raster operations module (ROP) 214, each of which can be implemented using conventional integrated circuit technologies or other technologies.

Front end 204 receives state information (STATE), rendering commands (CMD), and geometry data (GDATA), e.g., from CPU 102 of FIG. 1. In some embodiments, rather than providing geometry data directly, CPU 102 provides references to locations in system memory 104 at which geometry data is stored; data assembler 206 retrieves the data from system memory 104. In some embodiments, the geometry data includes vertex data for a reference subset, and also includes all or part of the associated control data for reconstructing the remainder of the symmetry group. In other embodiments, the state information may also include all or part of the control data. Apart from the inclusion of any control data, the state information, rendering commands, and geometry data may be of a generally conventional nature and may be used to define the desired rendered image or images, including geometry, lighting, shading, texture, motion, and/or camera parameters for a scene.

The geometry data includes vertex data defining objects (e.g., a table, a chair, a person or animal) that may be present in the scene. Objects, or parts of an object, may be symmetrical. In one embodiment, the geometry data includes the vertex data for a subset of vertices symmetrical to other vertices in a scene: i.e., the vertex data for a reference subset of the vertices of a symmetry group. In another embodiment, the geometry data may instead include vertex data for a larger set of vertices (e.g., an entire set of vertices which make up the larger symmetry group), and a downstream processing unit (e.g., in the multithreaded core array 202) may compress the vertex data into a smaller set of vertex data along with associated control data for reconstructing the broader set.

For an identified vertex, a position is specified in an object coordinate system, representing the position of the vertex. In addition to a position, each vertex may have various other attributes associated with it. In general, attributes of a vertex may include any property that is specified on a per-vertex basis; for instance, in some embodiments, the vertex attributes include scalar or vector attributes used to determine qualities such as the color, texture, transparency, lighting, shading, and animation of the vertex and its associated geometric primitives. In one embodiment, the control data described above may be included or otherwise integrated into the per-vertex attributes. Thus, the control data for processing vertex data to compute the additional vertices to reconstruct the remaining vertices of a symmetry group may be included with the per-vertex attributes. In other embodiments, this control data may be included in state information.

Objects may be modeled as groups of points, lines, triangles and/or other polygons (often referred to as "primitives"). Primitives, therefore, are generally defined by reference to their vertices. A single vertex may be included in any number of primitives. In some embodiments, each vertex is assigned an index (which may be any unique identifier), and a primitive may be defined by providing an ordered list of indices for the vertices making up that primitive. Other techniques for defining primitives (including conventional techniques such as triangle strips or fans) may also be used.

Primitives may be symmetrical to one another, or parts of primitives (i.e., lines, triangles and/or other polygons within a given primitive) may make up the symmetrical features. The set of vertices associated with a primitive may make up the reference subset symmetrical to one or more other sets of vertices in an object to be rendered. However, the reference subset may also include more than one primitive, or only a part of a primitive. Thus, the symmetry group for a group of vertices may be tied to their associated primitives, although symmetry among a group of vertices may also be independent from their attributes (e.g., be independent of primitives). Symmetry relationships may, but need not, occur on a per-primitive basis.

The state information and rendering commands define processing parameters and actions for various stages of rendering pipeline 200. Front end 204 directs the state information and rendering commands via a control path (not explicitly shown) to other components of rendering pipeline 200, such as the multithreaded core array 202. As is known in the art, these components may respond to received state information (e.g., the control data) by storing or updating values in various control registers that are accessed during processing.

Front end 204 directs the geometry data (i.e., the vertex data for the reference subset and, perhaps, associated per-vertex attributes which may include control data) to data assembler 206. Data assembler 206 formats the geometry data and prepares it for delivery to a geometry module 218 in multithreaded core array 202.

Geometry module 218 directs programmable processing engines (not explicitly shown) in multithreaded core array 202 to execute vertex and/or geometry shader programs on the vertex data, and the programs may be selected in response to the state information provided by front end 204. The vertex and/or geometry shader programs can be specified by the rendering application as is known in the art, and different shader programs can be applied to different vertices and/or primitives. The shader program(s) to be used can be stored in system memory or graphics memory and identified to multithreaded core array 202 via suitable rendering commands and state information as is known in the art. In some embodiments, vertex shader and/or geometry shader programs can be executed in multiple passes, with different processing operations being performed during each pass. Each vertex and/or geometry shader program may determine the number of passes and the operations to be performed during each pass. The number of passes may, in one embodiment, be specified or otherwise indicated in the set of control data. Vertex and/or geometry shader programs can implement algorithms using a wide range of mathematical and logical operations on vertices and other data, and the programs can include conditional or branching execution paths and direct and indirect memory accesses. The conditional or branching execution paths may be modified or otherwise dictated by the set of control data.

Vertex shader programs and geometry shader programs can be used to implement a variety of visual effects, including lighting and shading effects. For instance, in a simple embodiment, a vertex shader program transforms a vertex from its 3D object coordinate system to a 3D clip space or world space coordinate system. This transformation defines the relative positions of different objects in the scene. In one embodiment, the transformation can be programmed by including, in the rendering commands and/or data defining each object, a transformation matrix for converting from the object coordinate system of that object to clip space coordinates. The vertex shader program applies this transformation matrix to each vertex of the primitives making up an object. More complex vertex shader programs can be used to implement a variety of visual effects, including lighting and shading, procedural geometry, and animation operations. In one embodiment, the vertex shader program receives the vertex data for a reference subset of vertices symmetrical to certain other subsets of vertices in an object to be rendered, and may also receive the control data associated therewith. In this embodiment, the vertex data for the other symmetrical sets of vertices in the object is not received by the vertex shader program. The vertex shader program can then transform the received set of vertices from its 3D object coordinate system to a 3D clip space or world space coordinate system, and perform other operations described above. The vertex shader may then forward the set of vertices (perhaps with the associated control data) to the geometry shader.

Geometry shader programs differ from vertex shader programs in that geometry shader programs operate on groups of vertices (e.g., primitives) rather than individual vertices. In some instances, a geometry shader program may create new vertices and/or remove vertices or primitives from the set of objects being processed. In one embodiment, the geometry shader program is configured to receive and process the control data. In accordance with the parameters of the control data, the geometry shader may use the vertex data for the reference subset to create additional vertices to reconstruct all or part of the remainder of the symmetry group.

Thus, the geometry shader may utilize the vertex data for a reference subset of vertices in a symmetry group to reconstruct remaining vertices of the group, in accordance with the parameters set forth in the control data. In some embodiments, passes through a vertex shader program and a geometry shader program can be alternated to process the geometry data. As additional vertices are created by the geometry shader, they may be returned to the vertex shader programs for further processing. In some embodiments, the geometry shader receives the subset of the vertices of a symmetry group from the vertex shader; in other embodiments, other units may forward vertex data and/or control data to the geometry shader.

In some embodiments, vertex shader programs and geometry shader programs are executed using the same programmable processing engines in multithreaded core array 202. Thus, at certain times, a given processing engine may operate as a vertex shader, receiving and executing vertex shader program instructions, and at other times the same processing engine may operate as a geometry shader, receiving and executing geometry shader program instructions. The processing engines can be multithreaded, and different threads executing different types of shader programs may be in flight concurrently in multithreaded core array 202.

After the vertex and/or geometry shader programs have executed, geometry module 218 passes the processed geometry data (GDATA') to setup module 208. Thus, GDATA' may include vertex data for the additional set of vertices computed by the geometry shader to reconstruct the remaining vertices of the symmetry group. Setup module 208, which may be of generally conventional design, generates edge equations from the clip space or screen space coordinates of each set of vertices; the edge equations may be usable to determine whether a point in screen space is inside or outside the set of vertices.

Setup module 208 may provide each primitive (PRIM) to rasterizer 210. Note that in other embodiments, one or more sets of vertices may be provided to rasterizer 210 without a correspondence with a particular primitive, but for purposes of discussion assume that the set of vertices for a particular primitive are provided to rasterizer 210. Rasterizer 210, which may be of generally conventional design, determines which (if any) pixels are covered by the primitive, e.g., using conventional scan-conversion algorithms. As used herein, a "pixel" (or "fragment") refers generally to a region in 2-D screen space for which a single color value is to be determined; the number and arrangement of pixels can be a configurable parameter of rendering pipeline 200 and might or might not be correlated with the screen resolution of a particular display device. As is known in the art, pixel color may be sampled at multiple locations within the pixel (e.g., using conventional supersampling or multisampling techniques), and in some embodiments, supersampling or multisampling is handled within the pixel shader.

After determining which pixels are covered, rasterizer 210 provides the primitive (PRIM), along with a list of screen coordinates (X,Y) of the pixels covered, to a color assembly module 212. Color assembly module 212 associates the coverage information received from rasterizer 210 with attributes (e.g., color components, texture coordinates, surface normals) of the vertices and generates plane equations (or other suitable equations) defining some or all of the attributes as a function of position in screen coordinate space.

Color assembly module 212 provides the attribute equations (EQS, which may include e.g., the plane-equation coefficients A, B and C) for each of the vertices that covers at least one sampling location of a pixel and a list of screen coordinates (X,Y) of the covered pixels to a pixel module 224 in multithreaded core array 202. The functions of one or more of these units (setup 208, rasterizer 210, color assembly 212) may be performed by one of the processing engines of the multithreaded core array 202, or CPU 102, as well. Pixel module 224 directs programmable processing engines (not explicitly shown) in multithreaded core array 202 to execute one or more pixel shader programs on each pixel covered by the primitive, with the program(s) being selected in response to the state information provided by front end 204. Pixel shader programs can be used to implement a variety of visual effects, including lighting and shading effects, reflections, texture blending, procedural texture generation, and so on. Numerous examples of such per-pixel operations are known in the art and a detailed description is omitted as not being critical to understanding the present invention. Pixel shader programs can implement algorithms using a wide range of mathematical and logical operations on pixels and other data, and the programs can include conditional or branching execution paths and direct and indirect memory accesses.

Pixel shader programs are advantageously executed in multithreaded core array 202 using the same programmable processing engines that also execute the vertex and/or geometry shader programs. Thus, at certain times, a given processing engine may operate as a vertex shader, receiving and executing vertex shader program instructions; at other times the same processing engine may operate as a geometry shader, receiving and executing geometry shader program instructions; and at still other times the same processing engine may operate as a pixel shader, receiving and executing pixel shader program instructions. It will be appreciated that the multithreaded core array can provide natural load-balancing: where the application is geometry intensive (e.g., many small primitives), a larger fraction of the processing cycles in multithreaded core array 202 will tend to be devoted to vertex and/or geometry shaders, and where the application is pixel intensive (e.g., fewer and larger primitives shaded using complex pixel shader programs with multiple textures and the like), a larger fraction of the processing cycles will tend to be devoted to pixel shaders.

Once processing for a pixel or group of pixels is complete, pixel module 224 provides the processed pixels (PDATA) to ROP 214. ROP 214, which may be of generally conventional design, integrates the pixel values received from pixel module 224 with pixels of the image under construction in frame buffer 226, which may be located, e.g., in graphics memory 124. Once the image is complete, frame buffer 226 can be scanned out to a display device and/or subjected to further processing. It will be appreciated that the rendering pipeline described herein is illustrative and that variations and modifications are possible. The pipeline may include different units from those shown and the sequence of processing events may be varied from that described herein. Further, multiple instances of some or all of the modules described herein may be operated in parallel.

Figure 3:
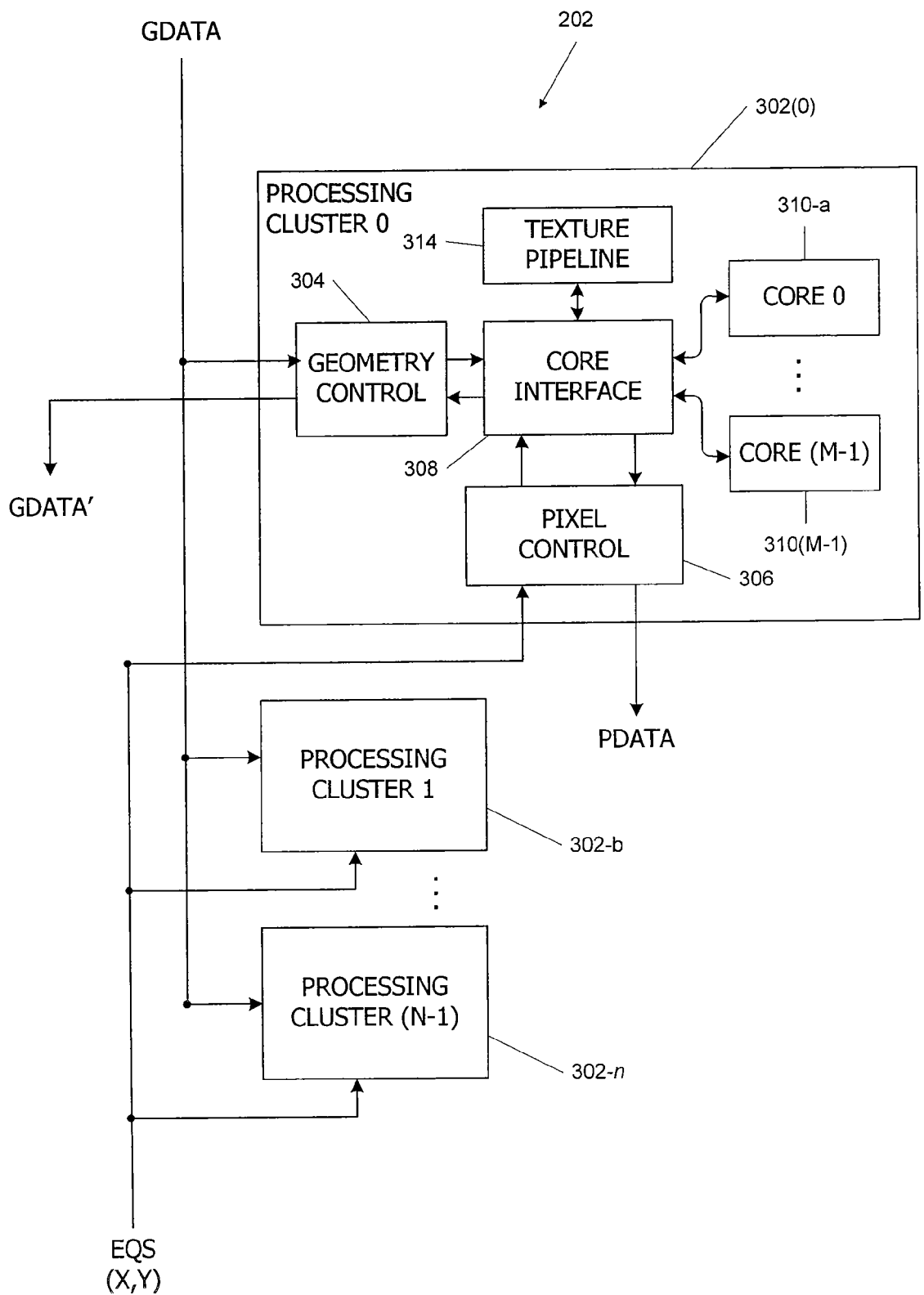
FIG. 3 is a block diagram of a multithreaded core array configured according to various embodiments of the present invention.

In one embodiment, multithreaded core array 202 provides a highly parallel architecture that supports concurrent execution of a large number of instances of vertex, geometry, and/or pixel shader programs in various combinations. FIG. 3 is a block diagram of multithreaded core array 202 according to an embodiment of the present invention.

In one embodiment, multithreaded core array 202 includes some number (N) of processing clusters 302. Herein, multiple instances of like objects are denoted with reference numbers identifying the object and parenthetical numbers identifying the instance where needed. Any number N (e.g., 1, 4, 8, or any other number) of processing clusters may be provided. In FIG. 3, one processing cluster 302 is shown in detail; it is to be understood that other processing clusters 302 can be of similar or identical design.

Each processing cluster 302 includes a geometry controller 304 (implementing geometry module 218 of FIG. 2) and a pixel controller 306 (implementing pixel module 224 of FIG. 2). Geometry controller 304 and pixel controller 306 each communicate with a core interface 308. Core interface 308 controls a number (M) of cores 310 that include the processing engines of multithreaded core array 202. Any number M (e.g., 1, 2, 4 or any other number) of cores 310 may be connected to a single core interface. Each core 310 is advantageously implemented as a multithreaded execution core capable of supporting a large number (e.g., 100 or more) of concurrent execution threads (where the term "thread" refers to an instance of a particular program executing on a particular set of input data), including a combination of vertex threads, geometry threads, and pixel threads.

Core interface 308 also controls a texture pipeline 314 that may be shared among cores 310. Texture pipeline 314, which may be of generally conventional design, advantageously includes logic circuits configured to receive texture coordinates, to fetch texture data corresponding to the texture coordinates from memory, and to filter the texture data according to various algorithms.

In operation, data assembler 206 (FIG. 2) provides geometry data GDATA to processing clusters 302. As noted above, this geometry data may include a reference subset of vertices symmetrical to one or more other subsets of vertices. In one embodiment, data assembler 206 divides the incoming stream of geometry data into portions and selects, e.g., based on availability of execution resources, which of processing clusters 302 is to receive the next portion of the geometry data. That portion (e.g., vertex data for a particular primitive, and associated control data) is delivered to geometry controller 304 in the selected processing cluster 302.

Geometry controller 304 forwards received data to core interface 308, which loads the vertex data into a core 310, then instructs core 310 to launch the appropriate vertex shader program. Upon completion of the vertex shader program, core interface 308 signals geometry controller 304. Geometry controller 304 then instructs core interface 308 to launch the geometry shader program. Control data may direct or otherwise indicate to the geometry controller 304 whether a geometry or vertex shader program should be launched, or if the programs are completed. In some embodiments, the processed vertex data is returned to geometry controller 304 upon completion of the vertex shader program, and geometry controller 304 instructs core interface 308 to reload the data before executing the geometry shader program. Any vertex data for new vertices created by the geometry shader (e.g., the new vertices computed to approximate the remainder of the symmetry group) may be returned to the vertex shader for further execution (e.g., according to control data). After completion of the vertex shader program and/or geometry shader program, geometry controller 304 provides the processed geometry data (GDATA') to setup module 208 of FIG. 2.

At the pixel stage, color assembly module 212 (FIG. 2) provides attribute equations EQS and pixel coordinates (X,Y) of pixels covered to processing clusters 302. In one embodiment, color assembly module 212 divides the incoming stream of coverage data into portions and selects, e.g., based on availability of execution resources or the location of the primitive in screen coordinates, which of processing clusters 302 is to receive the next portion of the data. That portion is delivered to pixel controller 306 in the selected processing cluster 302.

Pixel controller 306 delivers the data to core interface 308, which loads the pixel data into a core 310, then instructs the core 310 to launch the pixel shader program. It will be appreciated that the multithreaded core array described herein is illustrative and that variations and modifications are possible. Any number of processing clusters may be provided, and each processing cluster may include any number of cores. In some embodiments, shaders of certain types may be restricted to executing in certain processing clusters or in certain cores. Such design choices may be driven by considerations of hardware size and complexity versus performance, as is known in the art. The multithreaded core array can also be leveraged to perform general-purpose computations that might or might not be related to rendering images. In one embodiment, any computation that can be expressed in a data-parallel decomposition can be handled by the multithreaded core array as an array of threads executing in a single core (e.g., identifying or otherwise creating vertex data for a set of vertices symmetrical to one or more other sets of symmetry group, creating control data, etc.). Results of such computations may be written to the frame buffer and read back into system memory.

Figure 4:
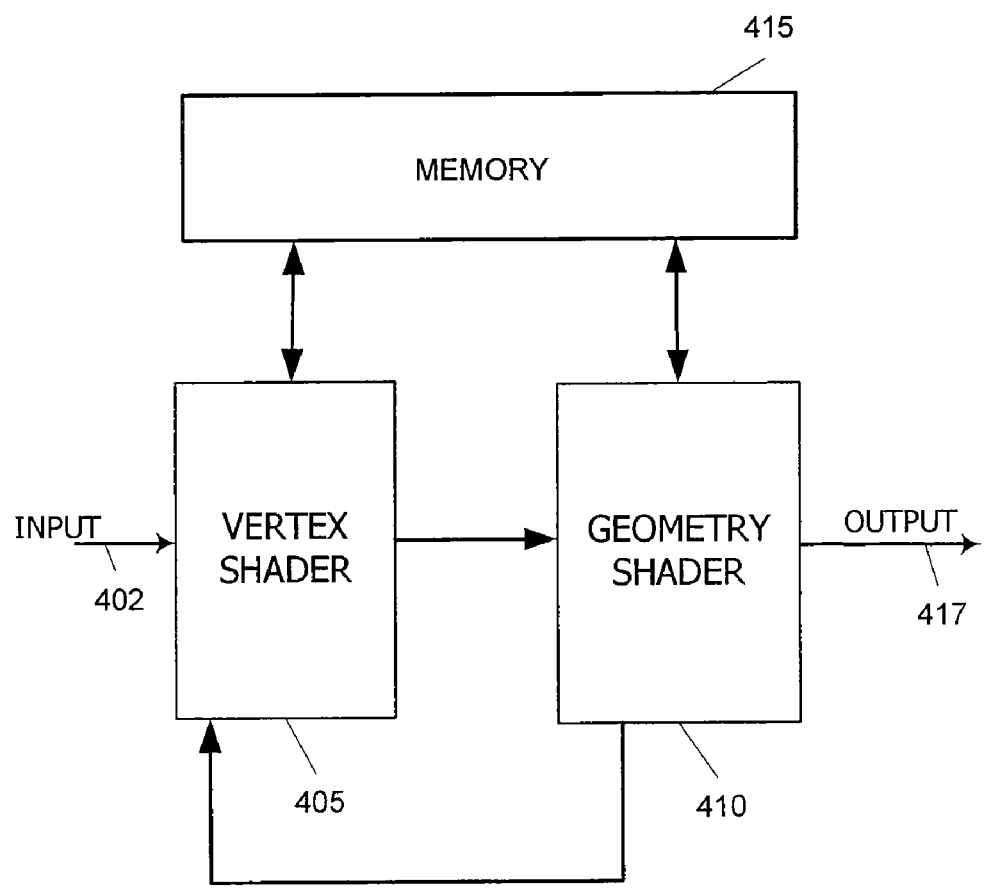
FIG. 4 is a block diagram illustrating some of the shader units of a rendering pipeline configured according to various embodiments of the present invention.

FIG. 4 is a block diagram of certain components 400 of a rendering pipeline, including a vertex shader 405, a geometry shader 410, and memory 415. These components may, for example, be included in the rendering pipeline 200 implemented in GPU 122 of FIG. 1. They may also be implemented as one or more shared processing engines in the multithreaded core array 202 of FIG. 3. Alternatively, they may be implemented as one, or more, Application Specific Integrated Circuits (ASICs) adapted to perform a subset of the applicable functions in hardware. The functions may also be performed by CPU 102 of the computer system 100 of FIG. 1. In other embodiments, other types of integrated circuits may be used (e.g., Structured/Platform ASICs, Field Programmable Gate Arrays (FPGAs) and other Semi-Custom ICs), which may be programmed in any manner known in the art. Each component may also be implemented, in whole or in part, with instructions embodied in a computer-readable medium, formatted to be executed by one or more general or application specific processors.

In one embodiment, vertex data 402 for a reference subset of vertices within a larger group of vertices is received by a vertex shader 405. This reference subset of vertices is symmetrical to one or more other subsets of vertices of the group. The vertex shader 405 performs any applicable transformations on the received vertex data, and may also perform lighting and shading, procedural geometry, and animation operations, e.g., by accessing memory 415 to retrieve vertex texture data. The vertex shader 405 may also receive, and forward, control data including parameters for computing additional vertices to reconstruct at least a part of the larger group. The geometry shader 410 is configured to receive the vertex data from the vertex shader 405 and compute additional vertices utilizing that vertex data, thereby reconstructing at least part of the group. In one embodiment, the geometry shader 410 also receives control data from the vertex shader 405 which includes parameters for computing additional vertices to reconstruct at least a part of the group. In another embodiment, the control data is accessed from memory, and is not received from the vertex shader 105. In yet another embodiment, the geometry shader receives a compressed set of data representative of the group of vertices, the compressed set including the vertex data for the reference subset of vertices symmetrical to other subsets, along with control data.

The geometry shader 410 may, therefore, be configured to use the set of control data in conjunction with the vertex data to compute additional vertices and thereby reconstruct at least a part of the larger group of vertices. The set of control data may include rules to be applied under only certain conditions. For example, the set of control data may identify a first subset of the additional vertices which is to be produced to varying levels of detail in different circumstances. In another embodiment, the set of control data identifies attributes to be applied only to a subset of the additional computed vertices, and not applied to the set of vertices from which the additional vertices are created. As noted above, this control data may be included with or otherwise integrated into the per-vertex attributes.

Once the geometry shader 410 has computed additional vertices to reconstruct at least a part of the symmetry group, the vertex data for the additional vertices may be returned to the vertex shader 405 for further execution (e.g., according to control data). The data (or subsets thereof) produced by the second pass through the vertex shader 405 may then be processed further by the geometry shader 410 or may be otherwise forwarded (e.g., according to control data). Thus, the control data may specify or otherwise indicate the number of passes through a vertex shader 405 or geometry shader 410. Each pass may produce a more detailed representation. Vertex data 417 including the additional vertices of the group may then be forwarded, for example, to a pixel shader.

Figure 5A:
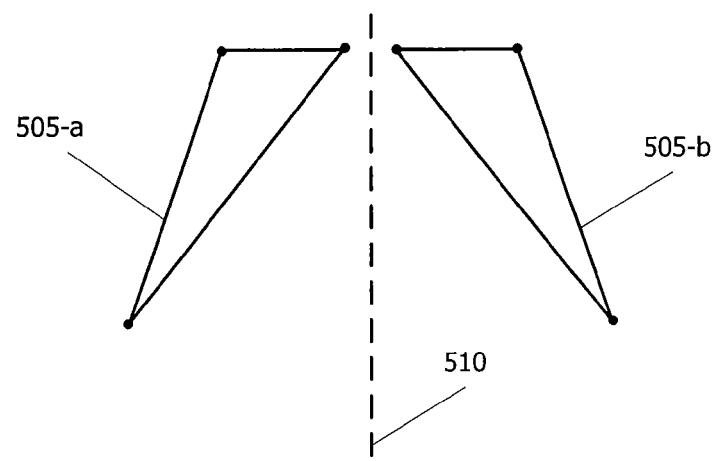
FIGS. 5A-5C illustrate various forms of symmetry utilized according to various embodiments of the present invention.

FIG. 5A is a diagram of two sets of vertices and their associated line segments 500 illustrating a basic example of reflection symmetry according to an embodiment of the invention. A first set 505-*a* of vertices and a second set 505-*b* of vertices are shown, illustrating the concept of two fold reflection symmetry. In one embodiment, CPU 102 of the computer system 100 of FIG. 1 is configured to execute a program to identify a symmetry group 505 among a number of vertices. Other algorithms or processes may be used to perform the identification, which may be done at runtime ("on the fly") or as an offline process (e.g. as part of the content authoring pipeline). CPU 102 may perform the operations described with respect to FIGS. 5A-5C, or the operations may be performed as otherwise known in the art. In this embodiment, CPU 102 identifies the reflection symmetry between the first 505-*a* and second 505-*b* sets of vertices.

Instead of forwarding vertex data for the first 505-*a* and second 505-*b* sets, CPU 102 may forward vertex data 505-*a* for the first set of vertices (i.e., the reference subset in this embodiment), and control data which describes the symmetry relationship and location of the second set 505-*b* with respect to the first set 505-*a*. In this embodiment, therefore, the control data might include coordinates defining the axis of reflection 510. The second set 505-*b* of vertices may be calculated using the vertex data 505-*a* for the first set with the control data.

Therefore, control data may include information on the particular symmetry relationship and the necessary translation information. The symmetry relationship may be one or more of reflection symmetry, rotational symmetry, translational symmetry, glide reflection symmetry, rotoreflection symmetry, or screw axis symmetry. Other symmetry relationships may be used as well, as evident to those skilled in the art. In addition to information regarding the symmetry relationship, the control data may include translation information, such as differences in position of certain vertices within an object coordinate system. For example, the position of a set of vertices to be computed may be specified relative to a known set of vertices. In some embodiments, the additional sets of vertices may be referenced relative to a vertex, line, axis, plane or combination thereof. Many objects, primitives, and other sets of vertices may have certain symmetrical associations that may be leveraged to produce computational savings. Generally, symmetry relationships with fewer degrees of freedom may produce greater computational improvements. When compressing vertex data, computational improvements may be weighed accordingly when determining which particular symmetry relationships to leverage, and the degree of allowable error.

The symmetry relationship between different sets of vertices need not be exact. Instead, the vertices of a symmetry group may be symmetrical with a threshold degree of error (e.g., within 1.0%). Control data may include information to correct the error, or may include information to introduce error (e.g. "noise") by design. In another embodiment, the symmetry relationship may be required to be exact.

Figure 5B:
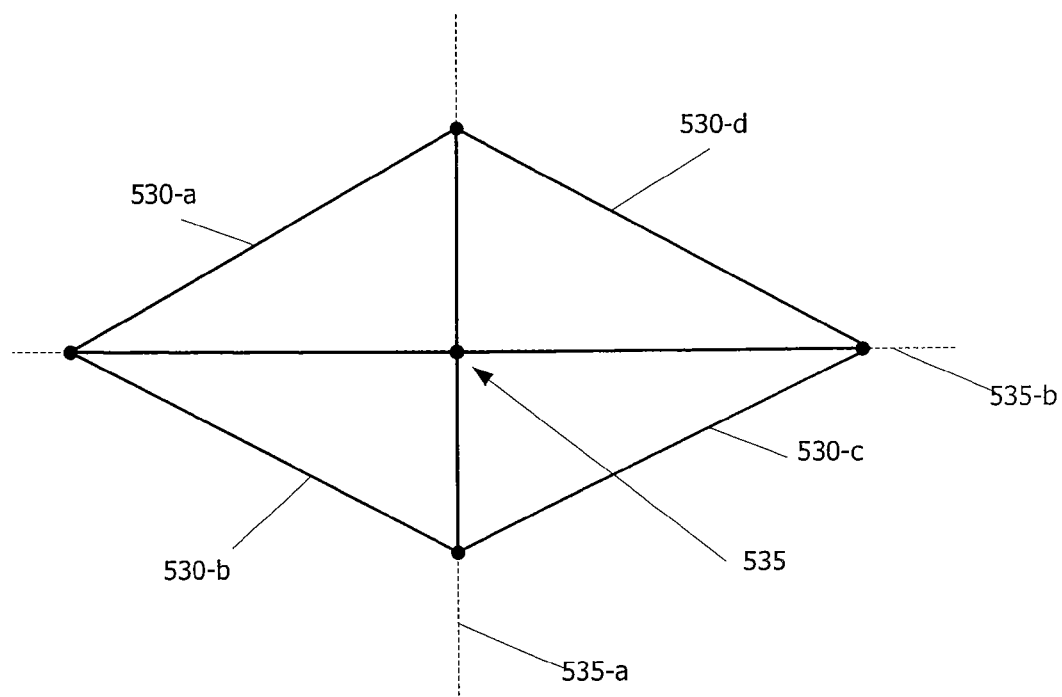

FIG. 5B is a diagram of a set of vertices and their associated line segments 525 illustrating an example of four fold reflection symmetry according to an embodiment of the invention. A first set 530-*a*, second set 530-*b*, third set 530-*c*, and fourth set 530-*d* of vertices have reflection symmetry to one another along two lines, illustrating the concept of four fold reflection symmetry. In this embodiment, instead of forwarding vertex data for four sets of vertices, CPU 102 may forward vertex data for the first set 505-*a* of vertices (i.e., the reference subset in this embodiment), and control data which describes the symmetry relationship and location of the second 530-*b*, third 530-*c*, and fourth 530-*d* sets with respect to the first set 505-*a*. In this embodiment, therefore, the control data might include coordinates defining the axes of reflection 535. The second 530-*b*, third 530-*c*, and fourth 530-*d* sets of vertices may be calculated using the vertex data for the first set 505-*a* in conjunction with the control data. Note that the symmetrical relationship may be between sets of vertices which share a set of two vertices, or share a single vertex 535. Note also that the set of vertices 525 illustrates an example of rotational symmetry around a shared vertex 535. Thus, the location of the second 530-*b*, third 530-*c*, and fourth 530-*d* sets of vertices may also be described (e.g., in control data) relative to their rotational symmetry relationship with the first set of vertices and a shared vertex 535.

Figure 5C:
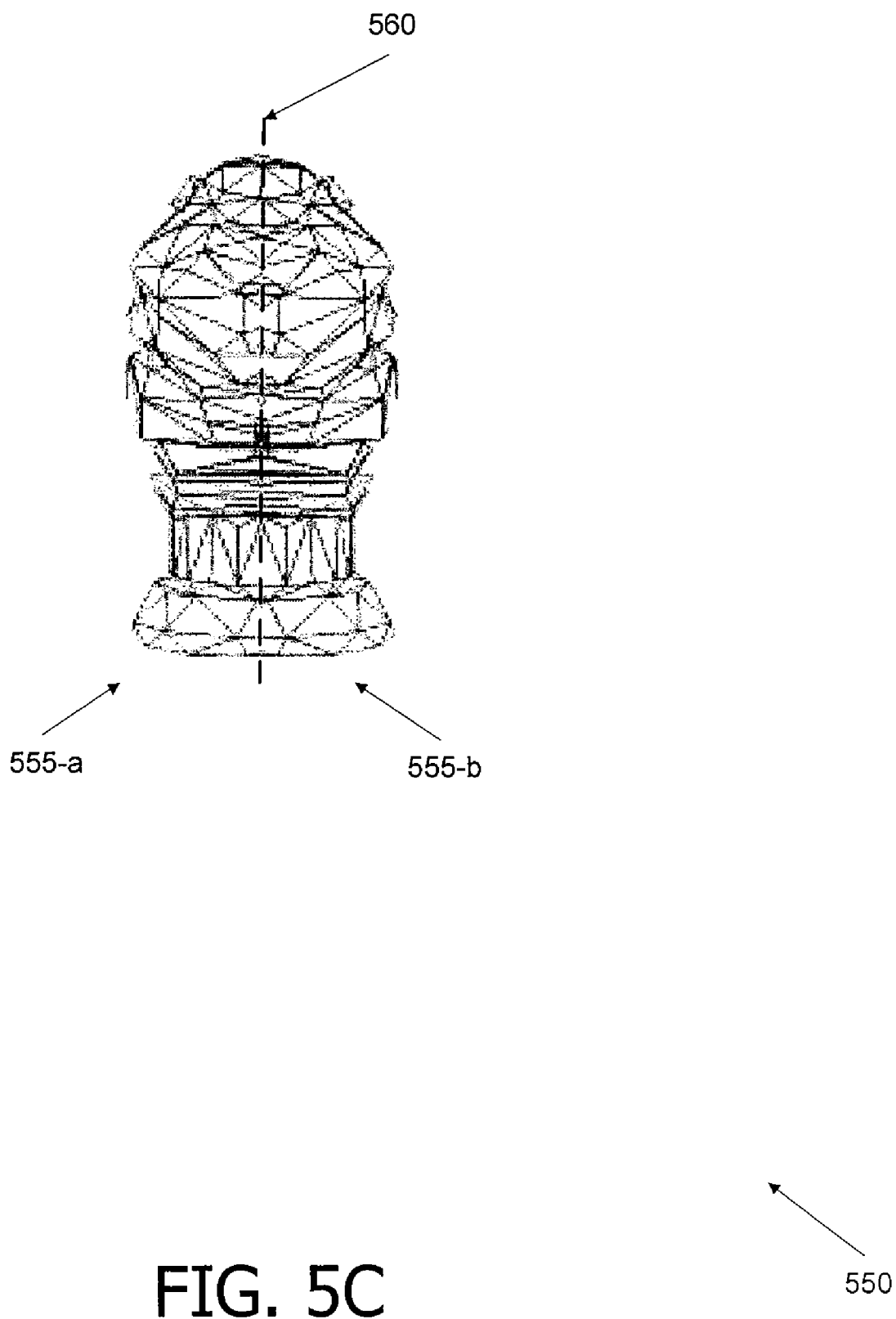

FIG. 5C is a diagram of a model 550 illustrating the symmetrical characteristics of a set of primitives and their associated vertices. The model 550 is a bust showing an example of reflection symmetry according to an embodiment of the invention. A first set 555-*a* and a second set 555-*b* of vertices are illustrated, and together make up a symmetry group characterized by reflection symmetry. In one embodiment, the first set 505-*a* is identified (e.g., by the CPU 102).

Instead of forwarding vertex data for the first set 555-*a* and second set 555-*b*, CPU 102 may forward vertex data for the first set 555-*a* of vertices (i.e., the reference subset in this embodiment), and control data which describes the symmetry relationship and location of the second set 555-*b* with respect to the first set 555-*a*. The second set 555-*b* of vertices may be calculated using the vertex data for the first set 555-*a* with the control data. In this embodiment the control data might include coordinates defining the plane of reflection 560.

Figure 6A:
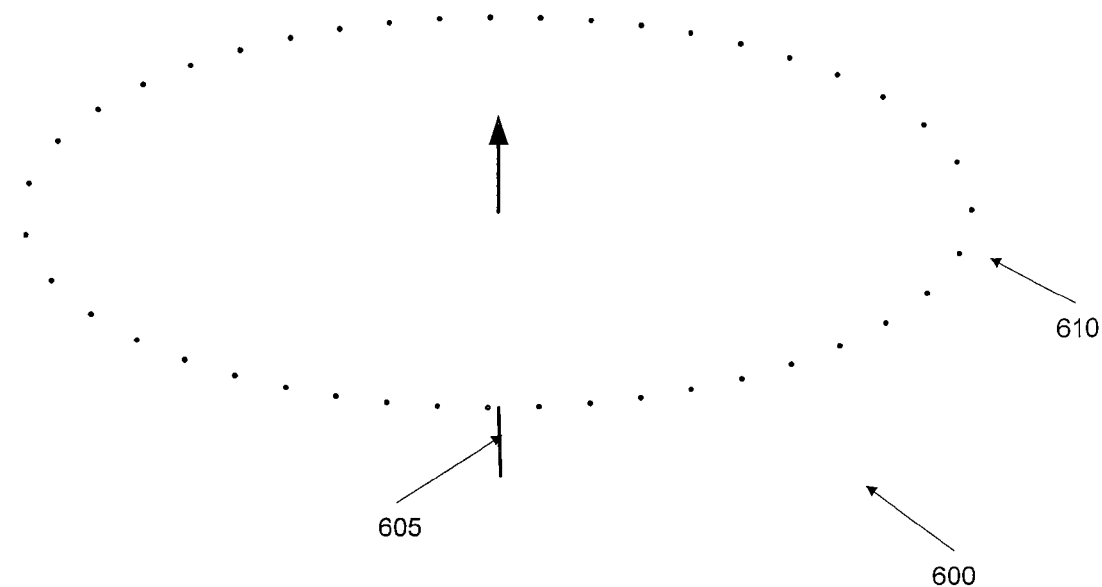
FIGS. 6A-6B illustrate additional forms of symmetry utilized according to various embodiments of the present invention.
Figure 6B:
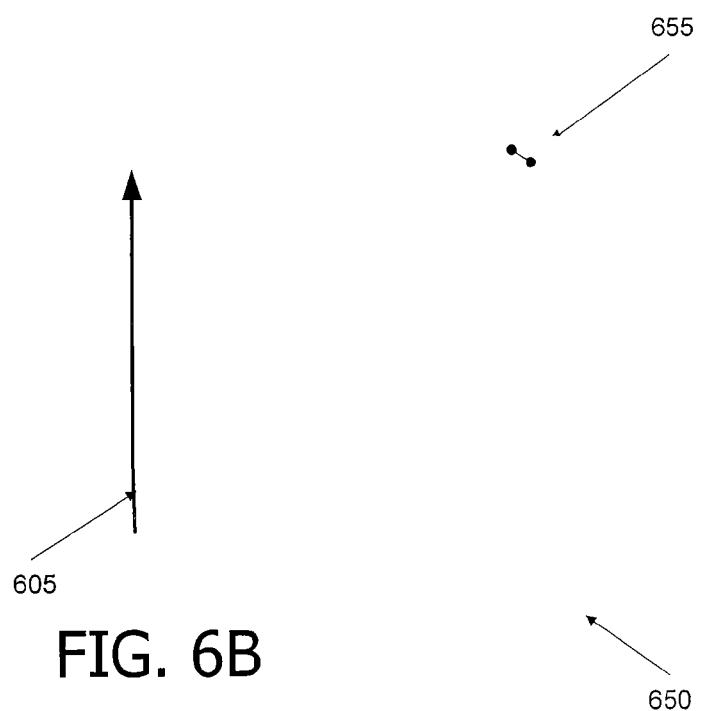

Turning to FIG. 6A, a depiction of the circular rim 600 of a cylinder is illustrated, illustrating another rotational symmetry relationship. In this embodiment, a series of vertices 610 (e.g., ≈40 vertices) are depicted around an axis 605, creating the appearance of a circular rim. Line segments may connect the vertices 605 to create the appearance of a circular rim. FIG. 6B is a diagram 650 depicting the axis 605, and one line segment 655 connecting two of the series of vertices 610. Instead of forwarding vertex data for each of the vertices 610 to render the rim, a compressed set of data may be forwarded instead. The compressed set of data may be made up of vertex data for the vertices of only one 655 of the line segments, along with control data which describes the symmetry relationship (i.e., rotational symmetry) and the location of each of the other vertices 610 with reference to the known vertices 655 (e.g., axis and offset information).

As noted above, the relationship between sets of vertices may be one, two, or more of the following symmetry relationships: reflection symmetry, rotational symmetry, translational symmetry, glide reflection symmetry, rotoreflection symmetry, or screw axis symmetry. Other symmetry relationships may be leveraged as well, as the foregoing symmetry relationships are set forth for illustrative purposes only. Also, as used herein, a symmetry relationship includes a relationship between that two sets of vertices that is within a certain degree of error (e.g., within 0.1%, 0.5%, etc.), unless the relationship is described as exact.

Figure 7:
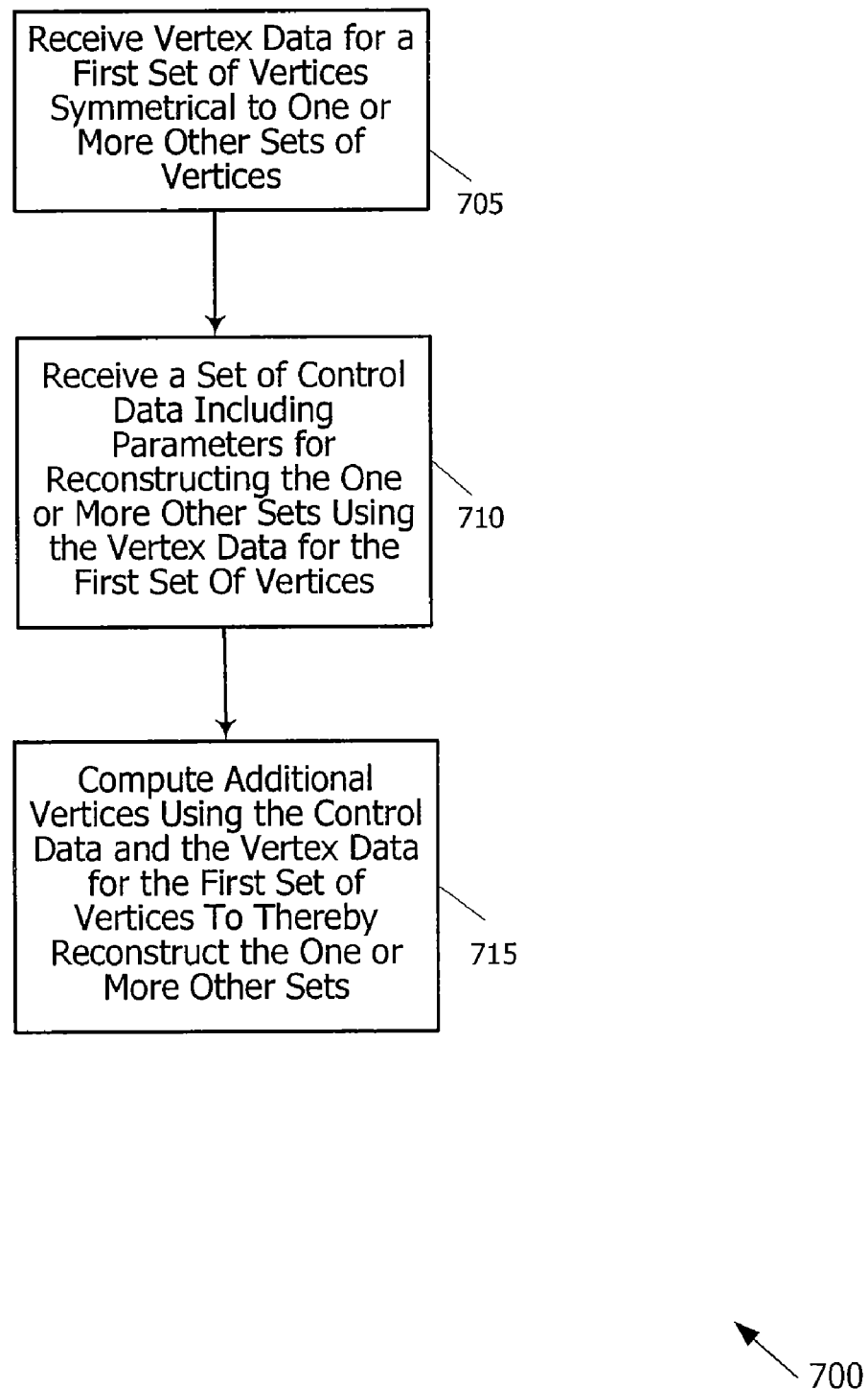
FIG. 7 is a flowchart illustrating a method for utilizing symmetrical properties in rendering according to various embodiments of the present invention.

FIG. 7 is a flowchart illustrating a process 700 for utilizing symmetrical properties in rendering, according to various embodiments of the present invention. The process may, for example, be performed in whole or in part by the rendering pipeline 200 of FIG. 2. At block 705, vertex data is received for a first set of vertices symmetrical to one or more other sets of vertices. At block 710, a set of control data is received, the control data including parameters for reconstructing the one or more other sets using the vertex data for the first set of vertices. At block 715, additional vertices are computed using the control data and the vertex data for the first set of vertices to thereby reconstruct the one or more other sets.

Figure 8:
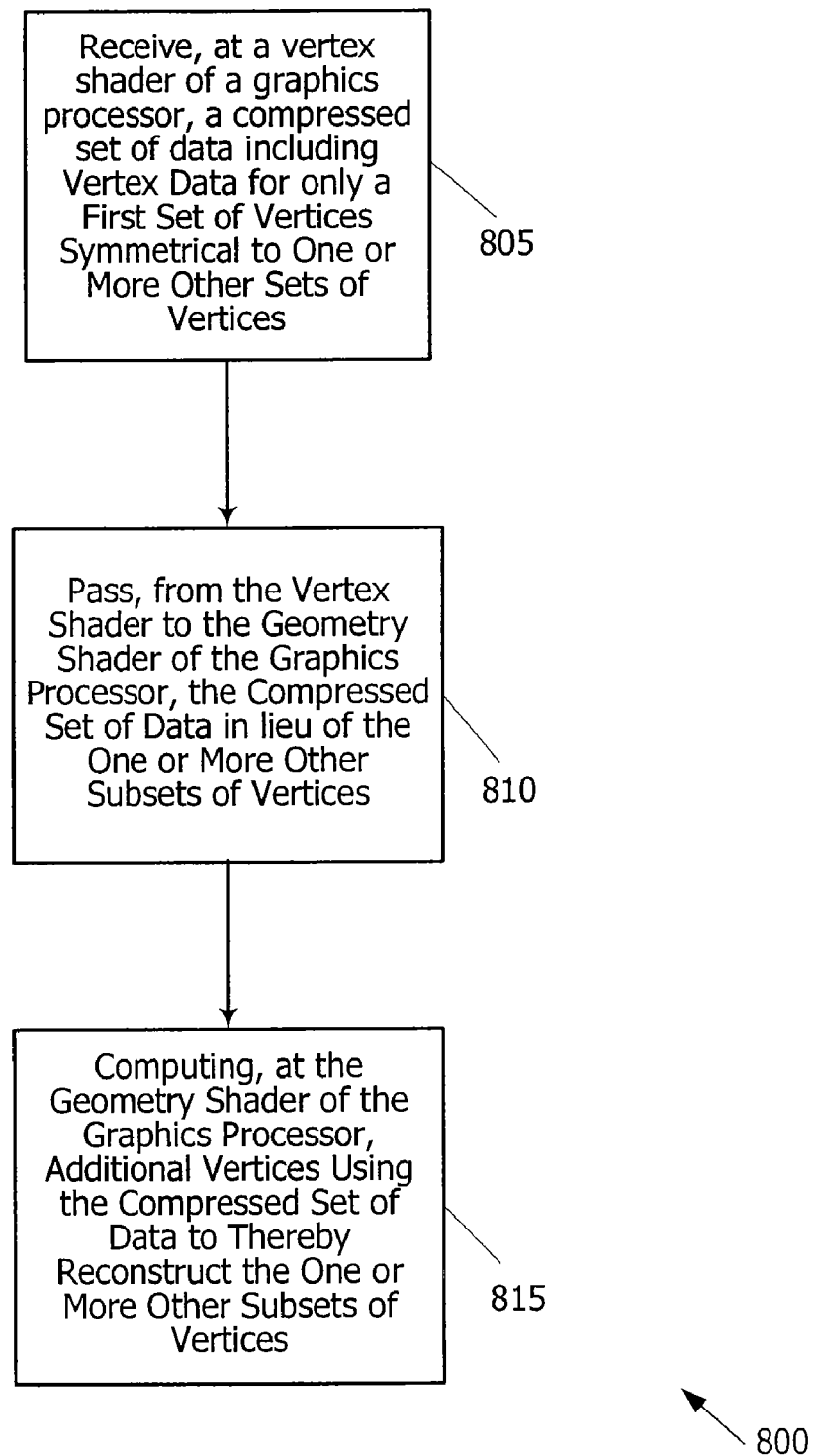
FIG. 8 is a flowchart illustrating a method for utilizing symmetrical properties in a graphics processor according to various embodiments of the present invention.

FIG. 8 is a flowchart illustrating a process 800 for utilizing symmetrical properties in rendering an image in a graphics processor, according to various embodiments of the present invention. The process may, for example, be performed in whole or in part by the components of the rendering pipeline 400 of FIG. 4. At block 805, a vertex shader of a graphics processor receives a compressed set of data including vertex data for only a first set of vertices symmetrical to one or more other sets of vertices. In one embodiment, the compressed set of data also includes control data specifying parameters for reconstructing the one or more other sets using the vertex data for the first set of vertices. At block 810, after performing typical vertex shader operations, the vertex shader passes the compressed set of data to the geometry shader of the graphics processor in lieu of the one or more other subsets of vertices. At block 815 the geometry shader computes additional vertices using the compressed set of data to thereby reconstruct the one or more other subsets of vertices.

Figure 9:
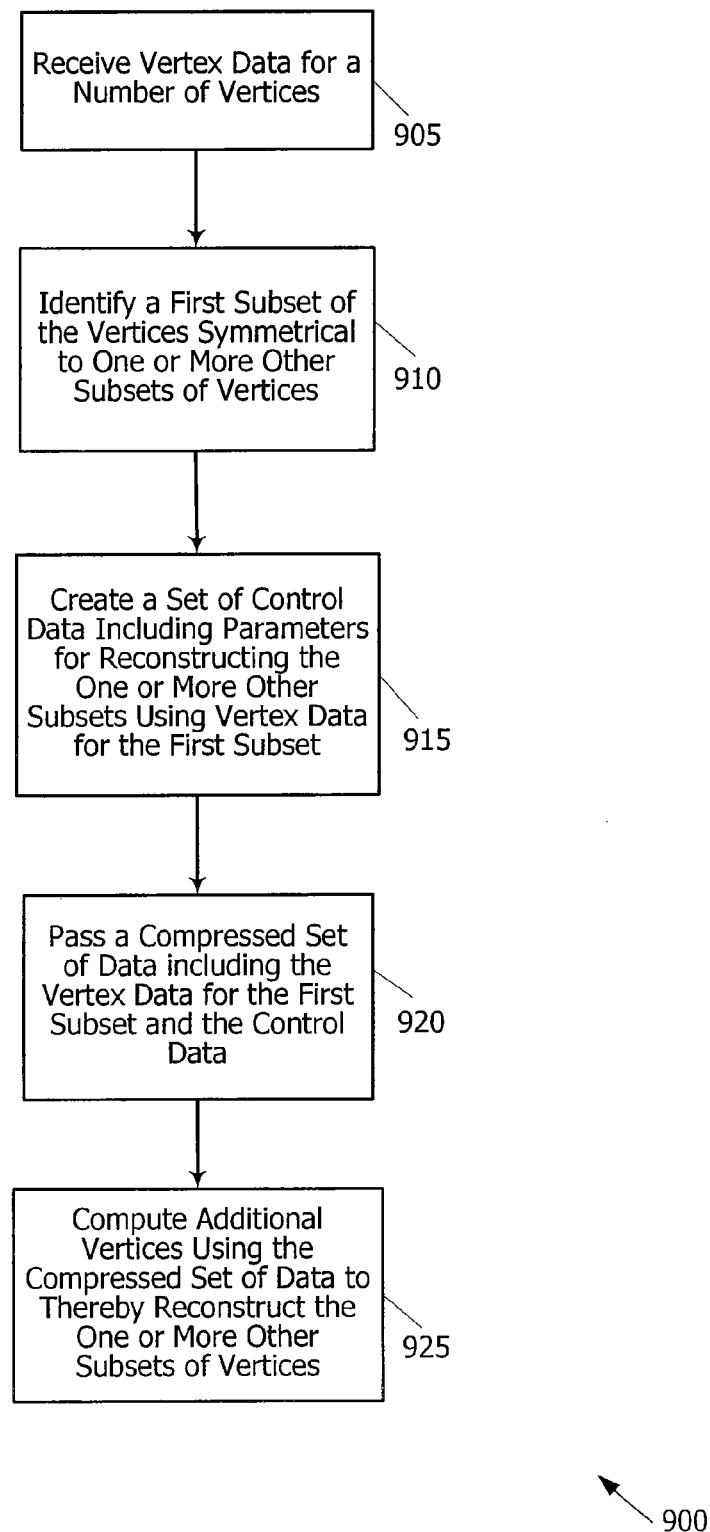
FIG. 9 is a flowchart illustrating a method for utilizing symmetrical properties in compressing vertex data for rendering according to various embodiments of the present invention.

FIG. 9 is a flowchart illustrating a process 900 for utilizing symmetrical properties to create a compressed set of vertex data, according to various embodiments of the present invention. The process may, for example, be performed in whole or in part by the components of the computer system 100 of FIG. 1. At block 905, vertex data is received for a group of vertices. At block 910, a first subset of the vertices symmetrical to one or more other subsets of vertices is identified. At block 915, a set of control data is created which includes parameters to be used to reconstruct the one or more other subsets using vertex data for the first subset.

At block 920, a compressed set of data is forwarded, including the vertex data for the first subset and the control data. The compressed set of data represents a compressed form of the vertex data for the group of vertices: i.e., representative of both the one or more other subsets of vertices and the first subset of vertices. At block 925, additional vertices are computed using the compressed set of data to thereby reconstruct the one or more other subsets of vertices.

It should be noted that the methods, systems and devices discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. Well-known circuits, processes, algorithms, structures, and techniques have been shown without unnecessary detail in order to avoid obscuring the embodiments.

Also, it is noted that the embodiments may be described as a process which is depicted as a flowchart or a block diagram. Although these may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the term "memory" may represent one or more devices for storing data, including read only memory (ROM), random access memory (RAM), magnetic RAM, core memory, magnetic disk storage mediums, optical storage mediums, flash memory devices or other machine readable mediums for storing information. The term "machine-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention, which is defined in the following claims.

What is claimed is:

1. A method of processing vertex data, the method comprising:
   with a vertex shader, receiving vertex data for a plurality of vertices;
   identifying a first subset of the plurality of vertices having at least one type of symmetry relationship of a number of types of symmetry relationships to one or more other subsets of the plurality of vertices;
   creating a set of control data including information identifying the at least one type of symmetry relationship for reconstructing at least a part of the one or more other subsets using vertex data for the first subset; and
   with a geometry shader, computing additional vertices using the control data and the vertex data for the first subset to thereby reconstruct at least a part of the one or more other subsets.

2. The method of claim 1, further comprising:
   identifying a symmetry group including the first subset and the one or more other subsets of the plurality of vertices.

3. The method of claim 1, further comprising:
   compressing the vertex data for the plurality of vertices into a compressed set of data including the vertex data for the first subset and the control data.

4. The method of claim 3, further comprising:
   passing the compressed set of data in lieu of the vertex data for the plurality of vertices.

5. The method of claim 3, further comprising:
   decompressing the compressed set of data by using the vertex data for the first subset and the control data in the reconstruction of the one or more other subsets.

6. The method of claim 1, wherein the first subset of the plurality of vertices is symmetrical to the one or more other subsets of the plurality via at least one of a following symmetry relationships: reflection symmetry, rotational symmetry, translational symmetry, glide reflection symmetry, rotoreflection symmetry, and screw axis symmetry.

7. The method of claim 6, further comprising:
   including information on at least two symmetry relationships in the set of control data, the set of control data formatted to reconstruct the one or more other subsets using the vertex data for the first subset, wherein the first subset of the plurality of vertices is symmetrical to one of the other subsets of the plurality via the at least two symmetry relationships.

8. The method of claim 1, wherein the first subset is symmetrical to one or more other subsets within a threshold degree of error.

9. The method of claim 1, wherein the plurality of vertices comprises a primitive.

10. The method of claim 1, wherein the first subset of vertices are symmetrical relative to at least one type of a number of types of geometries to the one or more other subsets of the plurality of vertices.

11. A method of processing vertex data, the method comprising:
    with a vertex shader, receiving vertex data for a first set of vertices symmetrical relative to at least one type of a number of types of geometries to one or more other sets of vertices;
    with a geometry shader, receiving a set of control data including information identifying the at least one type of geometry of a number of types of geometries for reconstructing at least a part of the one or more other sets using the vertex data for the first set of vertices; and
    with the geometry shader, computing additional vertices using the control data and the vertex data for the first set of vertices to thereby reconstruct at least a part of the one or more other sets.

12. The method of claim 11, further comprising:
    compressing vertex data for the one or more other sets of vertices into a compressed set of data including the vertex data for the first set of vertices and the control data, wherein the additional vertices are computed using the compressed set of data.

13. The method of claim 11, further comprising:
    receiving vertex data for the one or more other sets of vertices;
    identifying a symmetry group including the first set of vertices and the one or more other sets of vertices; and
    creating the set of control data based at least in part on the identified symmetry group.

14. The method of claim 11 wherein the types of geometries include: vertices, lines, and planes.

15. A graphics processor comprising:
    one or more upstream processing units configured to pass vertex data for a first set of vertices having at least one type of symmetry relationship of a number of types of symmetry relationships to one or more other sets of vertices; and
    a geometry shader, coupled with the one or more upstream processing units, and configured to:
      receive the vertex data for the first set of vertices;
      receive a set of control data including parameters for reconstructing at least a part of the one or more other sets using the vertex data for the first set of vertices, the control data comprising information identifying the at least one type of symmetry relationship; and
      compute additional vertices using the vertex data for the first set and the control data to thereby reconstruct at least a part of the one or more other subsets.

16. The processor of claim 15, wherein the one or more upstream processing units comprise a vertex shader.

17. The processor of claim 15, wherein the one or more upstream processing units are further configured to pass a set of control data including parameters for reconstructing at least a part of the one or more other subsets using vertex data for the first subset.

18. The processor of claim 15, wherein the one or more upstream processing units are further configured to receive a set of control data including parameters for reconstructing at least a part of the one or more other subsets using vertex data for the first subset.

19. The processor of claim 18, wherein the geometry shader is further configured to compute the additional vertices using the set of control data.

20. The processor of claim 18, wherein the vertex data for the first set of vertices and the control data comprise a compressed set of data corresponding to the vertex data for the plurality of vertices.

21. The processor of claim 20, wherein,
the one or more upstream processing units are configured to pass the compressed set of data to the geometry shader in lieu of the vertex data for the plurality of vertices; and
the geometry shader is further configured to compute the additional vertices using the compressed set of data.

22. The processor of claim 15, wherein the one or more upstream processing units are configured to identify a symmetry group including the first subset and the one or more other subsets of the plurality of vertices.

23. The processor of claim 15, wherein the types of symmetry relationships include: reflection symmetry, rotational symmetry, translational symmetry, glide reflection symmetry, rotoreflection symmetry, and screw axis symmetry.

24. The processor of claim 15, wherein the first set of vertices are symmetrical relative to at least one type of a number of types of geometries to the one or more other sets of vertices.

* * * * *